US009487161B2

(12) United States Patent
Rawlings et al.

(10) Patent No.: US 9,487,161 B2
(45) Date of Patent: Nov. 8, 2016

(54) ACCESSORY SYSTEM FOR A VEHICLE

(71) Applicant: MAGNA MIRRORS OF AMERICA, INC., Holland, MI (US)

(72) Inventors: Donald S. Rawlings, Caledonia, MI (US); Carol L. DeBoer, Zeeland, MI (US); Darryl P. De Wind, West Olive, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 139 days.

(21) Appl. No.: 14/504,667

(22) Filed: Oct. 2, 2014

(65) Prior Publication Data

US 2015/0097013 A1    Apr. 9, 2015

Related U.S. Application Data

(60) Provisional application No. 61/886,882, filed on Oct. 4, 2013.

(51) Int. Cl.
 *B60R 11/04* (2006.01)
 *B60R 1/12* (2006.01)
 *B60R 11/00* (2006.01)

(52) U.S. Cl.
 CPC ........ *B60R 11/04* (2013.01); *B60R 2001/1223* (2013.01); *B60R 2001/1253* (2013.01); *B60R 2011/0026* (2013.01)

(58) Field of Classification Search
 CPC .............. B60R 2001/1223; B60R 2001/1253; B60R 11/04; B60R 2011/0026
 See application file for complete search history.

(56) References Cited

U.S. PATENT DOCUMENTS

| 5,550,677 A | 8/1996 | Schofield et al. |
| 5,670,935 A | 9/1997 | Schofield et al. |
| 5,949,331 A | 9/1999 | Schofield et al. |
| 6,087,953 A | 7/2000 | DeLine et al. |
| 6,097,023 A | 8/2000 | Schofield et al. |
| 6,124,886 A | 9/2000 | DeLine et al. |
| 6,172,613 B1 | 1/2001 | DeLine et al. |
| 6,243,003 B1 | 6/2001 | DeLine et al. |
| 6,250,148 B1 * | 6/2001 | Lynam ...................... B60R 1/04 73/170.17 |

(Continued)

FOREIGN PATENT DOCUMENTS

| DE | 10355205 A1 * | 7/2005 | ............... B60R 1/12 |
| WO | WO2013/019795 | 2/2013 | |

(Continued)

*Primary Examiner* — Justin Larson
(74) *Attorney, Agent, or Firm* — Gardner, Linn, Burkhart & Flory, LLP

(57) ABSTRACT

An accessory system for a vehicle includes a bracket configured for adhesive attachment at an in-cabin surface of the vehicle windshield. The bracket includes an attaching portion having an aperture therethrough and includes a pair of attaching arms extending from the attaching portion. An interior rearview mirror assembly has a mounting base that is attached at the attaching portion of the bracket with the bracket adhesively attached at the windshield. With the mounting base attached at the attaching portion, a rain sensor is disposed at the in-cabin surface of the windshield and the aperture of the attaching portion circumscribes the rain sensor. With the bracket adhesively attached at the windshield, a forward camera module is attached at the attaching arms of the bracket and generally at the in-cabin surface of the windshield so that an imager of the forward camera module has a field of view through the windshield.

20 Claims, 5 Drawing Sheets

(56) References Cited

U.S. PATENT DOCUMENTS

| | | | |
|---|---|---|---|
| 6,278,377 B1 | 8/2001 | DeLine et al. | |
| 6,326,613 B1 * | 12/2001 | Heslin | B60R 1/04 250/214 AL |
| 6,329,925 B1 | 12/2001 | Skiver et al. | |
| 6,333,759 B1 * | 12/2001 | Mazzilli | B60R 1/12 348/148 |
| 6,341,523 B2 | 1/2002 | Lynam | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,501,387 B2 | 12/2002 | Skiver et al. | |
| 6,593,565 B2 | 7/2003 | Heslin et al. | |
| 6,690,268 B2 | 2/2004 | Schofield et al. | |
| 6,774,356 B2 | 8/2004 | Heslin | |
| 6,824,281 B2 * | 11/2004 | Schofield | B60R 1/04 359/838 |
| 6,946,978 B2 * | 9/2005 | Schofield | G01C 21/165 340/988 |
| 6,968,736 B2 | 11/2005 | Lynam | |
| 7,004,593 B2 * | 2/2006 | Weller | B60R 1/12 340/438 |
| 7,188,963 B2 * | 3/2007 | Schofield | B60R 1/04 359/844 |
| 7,262,406 B2 | 8/2007 | Heslin et al. | |
| 7,265,342 B2 | 9/2007 | Heslin et al. | |
| 7,289,037 B2 | 10/2007 | Uken et al. | |
| 7,344,261 B2 | 3/2008 | Schofield et al. | |
| 7,420,159 B2 | 9/2008 | Heslin et al. | |
| 7,423,248 B2 | 9/2008 | Schofield et al. | |
| 7,480,149 B2 * | 1/2009 | DeWard | B60R 11/04 340/438 |
| 7,533,998 B2 * | 5/2009 | Schofield | B60R 1/04 348/118 |
| 7,538,316 B2 | 5/2009 | Heslin et al. | |
| 7,889,086 B2 * | 2/2011 | Schafer | B60R 11/04 250/208.1 |
| 7,916,009 B2 | 3/2011 | Schofield et al. | |
| 7,946,505 B2 | 5/2011 | Lynam et al. | |
| 7,994,462 B2 | 8/2011 | Schofield et al. | |
| 8,179,437 B2 | 5/2012 | Schofield et al. | |
| 8,203,440 B2 | 6/2012 | Schofield et al. | |
| 8,222,588 B2 | 7/2012 | Schofield et al. | |
| 8,239,086 B2 | 8/2012 | Higgins-Luthman | |
| 8,256,821 B2 * | 9/2012 | Lawlor | B60R 1/12 296/37.8 |
| 8,289,142 B2 | 10/2012 | Pawlicki et al. | |
| 8,314,689 B2 | 11/2012 | Schofield et al. | |
| 8,324,552 B2 | 12/2012 | Schofield et al. | |
| 8,405,726 B2 | 3/2013 | Schofield et al. | |
| 8,451,332 B2 * | 5/2013 | Rawlings | B60R 1/04 348/148 |
| 8,534,887 B2 | 9/2013 | DeLine | |
| 8,585,302 B2 * | 11/2013 | Totani | B60R 11/04 348/148 |
| 8,743,203 B2 | 6/2014 | Karner | |
| 8,818,042 B2 * | 8/2014 | Schofield | G06K 9/00818 348/211.3 |
| 8,851,690 B2 | 10/2014 | Uken | |
| 8,922,867 B2 * | 12/2014 | De Wind | B60R 1/04 359/267 |
| 8,944,655 B2 | 2/2015 | Verrat-Debailleul | |
| 8,944,705 B1 * | 2/2015 | Matori | G03B 17/561 396/419 |
| 9,090,213 B2 * | 7/2015 | Lawlor | B60R 1/12 |
| 9,150,165 B1 | 10/2015 | Fortin | |
| 9,156,403 B2 | 10/2015 | Rawlings | |
| 9,193,308 B2 * | 11/2015 | Okuda | B60R 11/04 |
| 9,225,884 B2 * | 12/2015 | Blake, III | B60R 11/00 |
| 9,272,665 B2 * | 3/2016 | Minikey, Jr. | B60R 1/04 |
| 2003/0210328 A1 * | 11/2003 | Mazzilli | B60R 1/12 348/148 |
| 2006/0050018 A1 | 3/2006 | Hutzel et al. | |
| 2009/0295181 A1 | 12/2009 | Lawlor et al. | |
| 2010/0065707 A1 * | 3/2010 | Hansel | B60R 11/04 248/298.1 |
| 2011/0168866 A9 * | 7/2011 | Gruener | B60R 11/02 248/475.1 |
| 2012/0181315 A1 * | 7/2012 | Lai | B60R 11/00 224/567 |
| 2012/0310519 A1 * | 12/2012 | Lawlor | B60R 1/12 701/301 |
| 2013/0076905 A1 * | 3/2013 | Blake, III | B60R 11/00 348/148 |
| 2014/0055617 A1 * | 2/2014 | Minikey, Jr. | B60R 1/04 348/148 |
| 2014/0226012 A1 | 8/2014 | Achenbach et al. | |
| 2015/0041510 A1 * | 2/2015 | Frenzel | B60R 11/04 224/482 |
| 2015/0042798 A1 * | 2/2015 | Takeda | H04N 5/2252 348/148 |
| 2015/0097013 A1 * | 4/2015 | Rawlings | B60R 11/04 224/567 |
| 2015/0109447 A1 * | 4/2015 | Okuda | B60R 11/04 348/148 |
| 2015/0251605 A1 * | 9/2015 | Uken | B60R 19/28 248/467 |
| 2015/0256729 A1 * | 9/2015 | Wato | G03B 11/045 348/311 |
| 2015/0329063 A1 * | 11/2015 | Lawlor | B60R 1/12 248/205.3 |
| 2016/0009230 A1 * | 1/2016 | Miyado | B60R 11/04 224/482 |
| 2016/0023620 A1 * | 1/2016 | Matori | B60R 11/04 348/148 |

FOREIGN PATENT DOCUMENTS

| | | |
|---|---|---|
| WO | WO2013/081984 | 6/2013 |
| WO | WO2013/081985 | 6/2013 |
| WO | WO2013/123161 | 8/2013 |

* cited by examiner

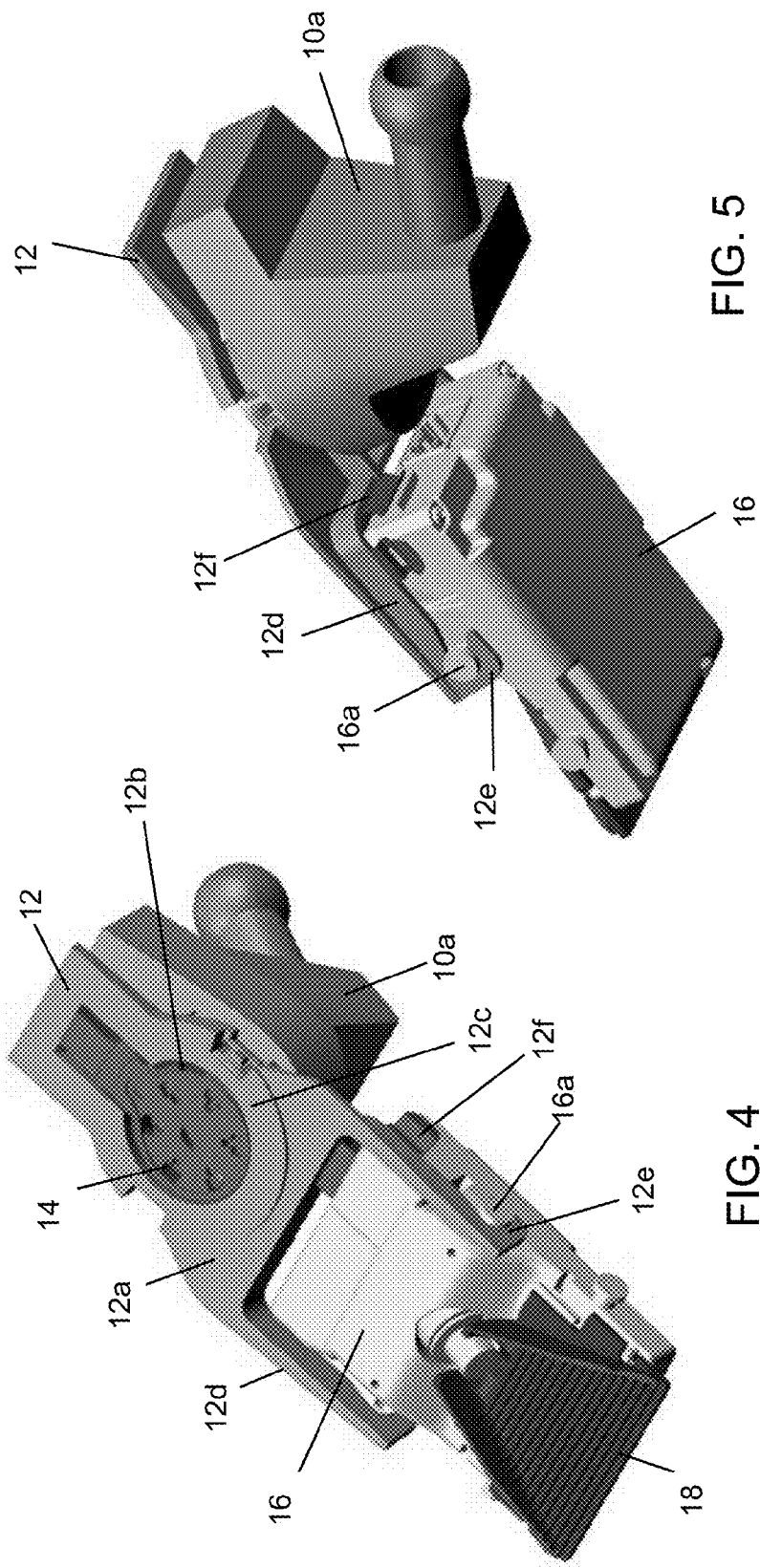

ACCESSORY SYSTEM FOR A VEHICLE

CROSS REFERENCE TO RELATED APPLICATION

The present application claims the filing benefits of U.S. provisional application Ser. No. 61/886,882, filed Oct. 4, 2013, which is hereby incorporated herein by reference in its entirety.

FIELD OF THE INVENTION

The present invention relates generally to the field of vehicle accessories and, more particular to accessories, including interior rearview mirror assemblies, mounted at an in-cabin surface of a vehicle windshield.

BACKGROUND OF THE INVENTION

It is known to provide a mirror assembly that is adjustably mounted to an interior portion of a vehicle, such as via a single or double ball pivot or joint mounting configuration where the mirror casing and reflective element are adjusted relative to the interior portion of a vehicle by pivotal movement about the single or double ball pivot configuration. The mirror casing and reflective element are pivotable about one or more ball pivot joints by a user that is adjusting a rearward field of view of the reflective element. It is also known to provide a forward facing camera module at the vehicle windshield and separate from the mirror assembly.

SUMMARY OF THE INVENTION

The present invention provides an interior rearview mirror system or accessory mounting system that includes a bracket attached (such as adhesively attached or bonded) at the in-cabin surface of a vehicle windshield, with the bracket supporting or mounting a mirror assembly, a rain sensor and a forward camera module (FCM) at the windshield. The bracket is configured such that the three components or devices can be readily attached at or snapped onto the bracket with the bracket already attached at the windshield surface. Thus, the bracket may be attached at the windshield surface at the windshield supplier plant or facility and shipped to a vehicle assembly plant, where the accessories or components or devices may be attached at the bracket at the windshield after the windshield is installed on a vehicle and as the vehicle moves along the vehicle assembly line.

These and other objects, advantages, purposes and features of the present invention will become apparent upon review of the following specification in conjunction with the drawings.

BRIEF DESCRIPTION OF THE DRAWINGS

FIGS. 4 and 5 are perspective views of the accessory mounting system of the present invention;

DESCRIPTION OF THE PREFERRED EMBODIMENTS

Figure 1:
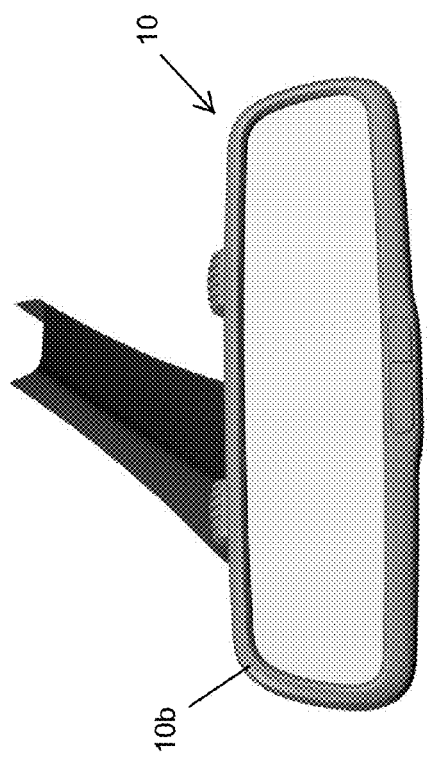
FIG. 1 is a perspective view of an accessory mounting system in accordance with the present invention.
Figure 2:
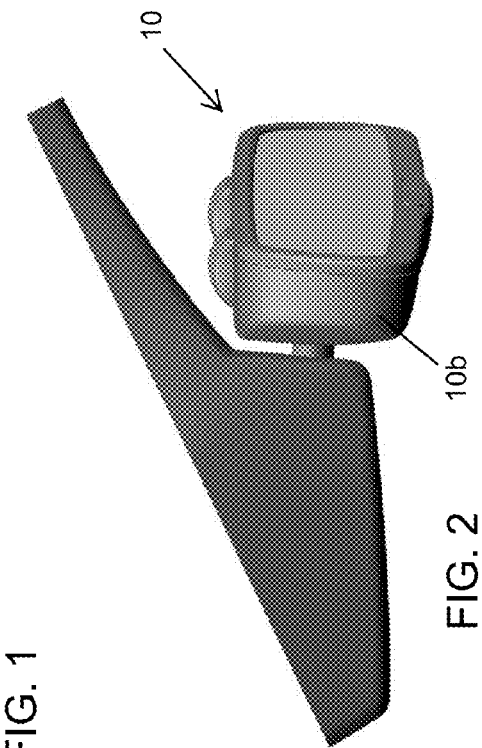
FIG. 2 is a side elevation of the accessory mounting system of FIG. 1.
Figure 3:
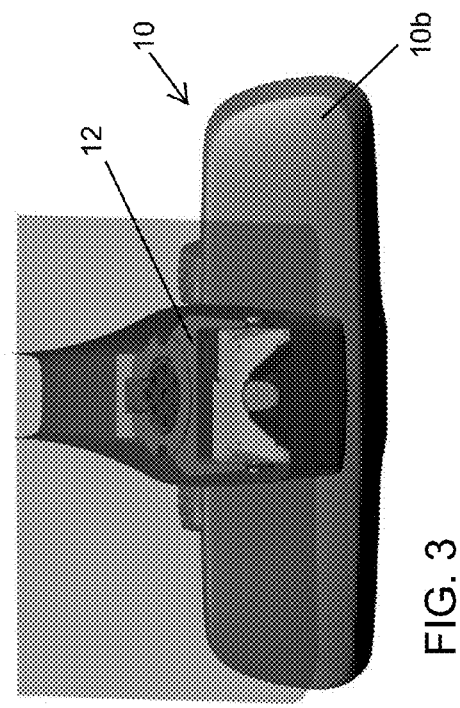
FIG. 3 is a front view of the accessory mounting system of FIG. 1, shown as viewed through the windshield of the vehicle.
Figure 6:
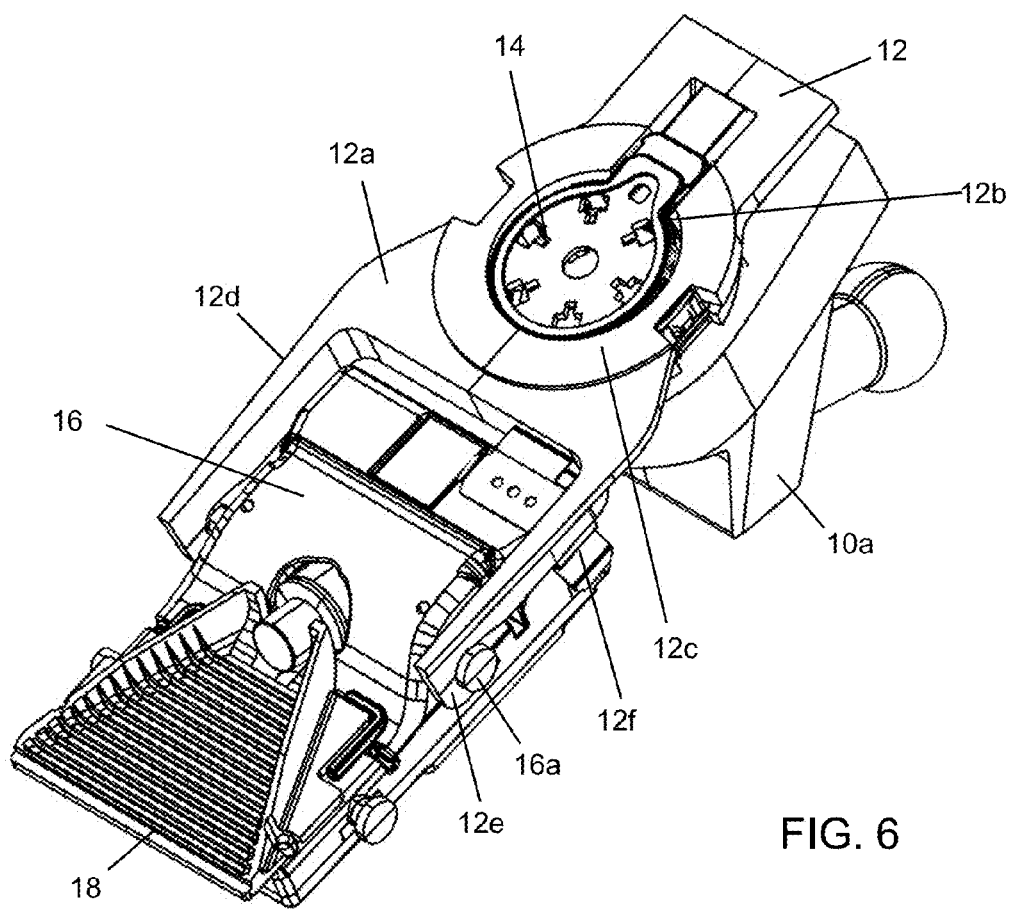
FIG. 6 is another perspective view of the accessory mounting system of FIGS. 4 and 5.

A vehicular accessory system or accessory mounting system (for mounting a mirror assembly and camera) can be installed on the inside of the front windshield of a vehicle, such as a car, truck, bus or van or the like. The camera may comprise a forward facing camera having a field of view through the windshield of the vehicle and may be used for a variety of functions, such as object detection, lane keeping, traffic sign recognition and/or headlamp control and/or the like. As shown in FIGS. 1-3, the accessory system includes a bracket 12, which mounts the mirror assembly 10 and a rain sensor 14 and a camera module 16 at the windshield of a vehicle.

The bracket 12 is attached to the windshield, as shown, such as adhesively attached at the windshield or the like. The camera system or camera module and bracket of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication No. US-2009-0295181, which are all hereby incorporated herein by reference in their entireties.

The system of the present invention includes a bracket 12 that holds or supports or mounts all three devices (mirror assembly, rain sensor and forward facing camera module) at the windshield. In the illustrated embodiment, the bracket 12 comprises a generally flat or planar attachment surface 12a (which is adhesively attachable at an inner surface of the vehicle windshield), with an aperture 12b at a generally central region 12c of the bracket for the rain sensor to view through when the rain sensor 14 is received at the bracket and the bracket is mounted at the windshield. A pair of tabs or legs or arms 12d extend from the central region 12c and downward along the windshield and include hooks or attaching portions 12e that are configured to hook around respective tabs or protrusions 16a of the camera module 16.

The generally central region 12c of the bracket is configured for attachment of the mirror assembly 10. For example, the central region 12c may be configured for attachment of a mirror mounting base or mounting structure 10a for pivotally mounting the mirror head 10b of the mirror assembly thereat. The mounting base 10a may snap attach at the generally central region of the bracket 12 with the bracket adhesively attached at the windshield (and optionally with the rain sensor disposed at the aperture of the generally central region of the bracket or with the rain sensor disposed at the mirror mounting base so that the mirror mounting base and rain sensor construction or assembly are snap attached at the bracket).

Each of the devices or accessories may be readily attached at the bracket at the vehicle assembly plant and after the bracket is adhesively attached at the vehicle windshield. The bracket may be adhesively attached at the windshield at the windshield supplier and before the windshield is shipped to the vehicle assembly plant. The bracket is slim enough for enhanced windshield shipping density.

The mounting system or configuration or structure of the present invention mounts all of the devices at or on the vehicle center line. The overall packaging of the devices and bracket meets the wiper and frit requirements of the vehicle manufacturer. Optionally, a wire cover or housing (FIGS. 1-3) may be attached at the bracket to house or encase the devices and any wiring that may be routed along the windshield to a vehicle wiring at the headliner of the vehicle.

The accessory system or mounting system of the present invention thus provides enhanced mounting for a forward camera module and mirror assembly via a common bracket attached at the vehicle windshield. By mounting the camera at the bracket and spaced from the mirror mount, the camera performance is not affected by mirror position tolerances, and the camera and mirror vibration inputs are decoupled. The single windshield bracket of the system of the present invention thus replaces three independent or separate brackets, with the single bracket providing centerline packaging that meets LHD RHD requirements. A wire cover may firmly attach to the windshield bracket to substantially encase or house or guide wiring from the accessories and bracket, along the windshield and to a headliner of the vehicle.

In the illustrated embodiment, the camera module 16 includes a light shield 18 and may include other aspects of the camera modules and systems described in International Publication No. WO 2013/123161, which is hereby incorporated herein by reference in its entirety. After the light shield is attached or adhered at the camera module, the camera module and light shield construction or assembly may be attached at the bracket (which may already be attached at the vehicle windshield). The bracket and light shield may be selected for a particular vehicle windshield application to adapt or configure the camera module for that particular vehicle windshield application.

In the illustrated embodiment, the bracket 12 (such as a metallic bracket formed by stamping or die casting or the like, and can be formed of a metal, such as zinc, aluminum, magnesium or the like, or can be formed as an engineered plastic or the like) comprises the generally planar portion 12a and a pair of spaced apart forward tabs or arms 12d and a rearward side tabs 12f. The hooks 12e of the forward tabs or arms 12d are configured to receive respective posts or protrusions 16a at the rear of the camera module as the camera module is moved or pivoted towards the bracket 12. When the posts 16a are received in the hooks 12e of the bracket 12, the camera module 16 is pivoted upward until the rearward tabs 12f engage the camera module at the upper rear region of the camera module. The rearward tabs 12f may flex to receive and retain the tabs or protrusions or structure at the rear of the camera module to secure or retain or mount or attach the camera module 16 at the bracket 12. The bracket 12 is formed so that, when the camera module and light shield assembly is attached at the bracket, the bracket does not interfere with the forward field of view of the imager.

The bracket is formed such that it at least partially circumscribes the light shield, with the roof or upper boundary of the light shield (when disposed at the windshield-attached bracket) comprising the windshield. Optionally, a sealing element may be disposed at and along the upper edge region of the light shield for sealing against the in-cabin surface of the windshield or against a portion of the bracket (where the bracket may overlap the side walls of the light shield, and where the bracket may include a sealing element to seal against the in-cabin surface of the windshield). Thus, when the light shield and camera module are disposed at the windshield-attached bracket, the roof of the pocket (the upper boundary of the pocket of the stray light shield) is formed by the windshield and optionally a portion of the bracket and windshield. For example, the stray light shield, when disposed at the windshield-attached bracket, is aligned with an aperture or opening of the bracket, and a perimeter portion of the bracket that circumscribes or partially circumscribes the bracket aperture or opening may overlap the side walls and may extend over the stray light shield such that a small portion of the "roof" of the stray light shield comprises the circumscribing portion of the bracket (and optionally the circumscribing portion of the bracket may have light traps or ribs or columns thereat). The field of view of the camera, when the camera module and stray light shield are disposed at the windshield-attached bracket, preferably views through the aperture of the bracket (and may also view through an aperture of an opaque layer or frit layer at the windshield) and preferably does not encompass the circumscribing portion of the bracket (or any portion of the opaque layer at the windshield that circumscribes the aperture at the opaque layer).

Figure 7:
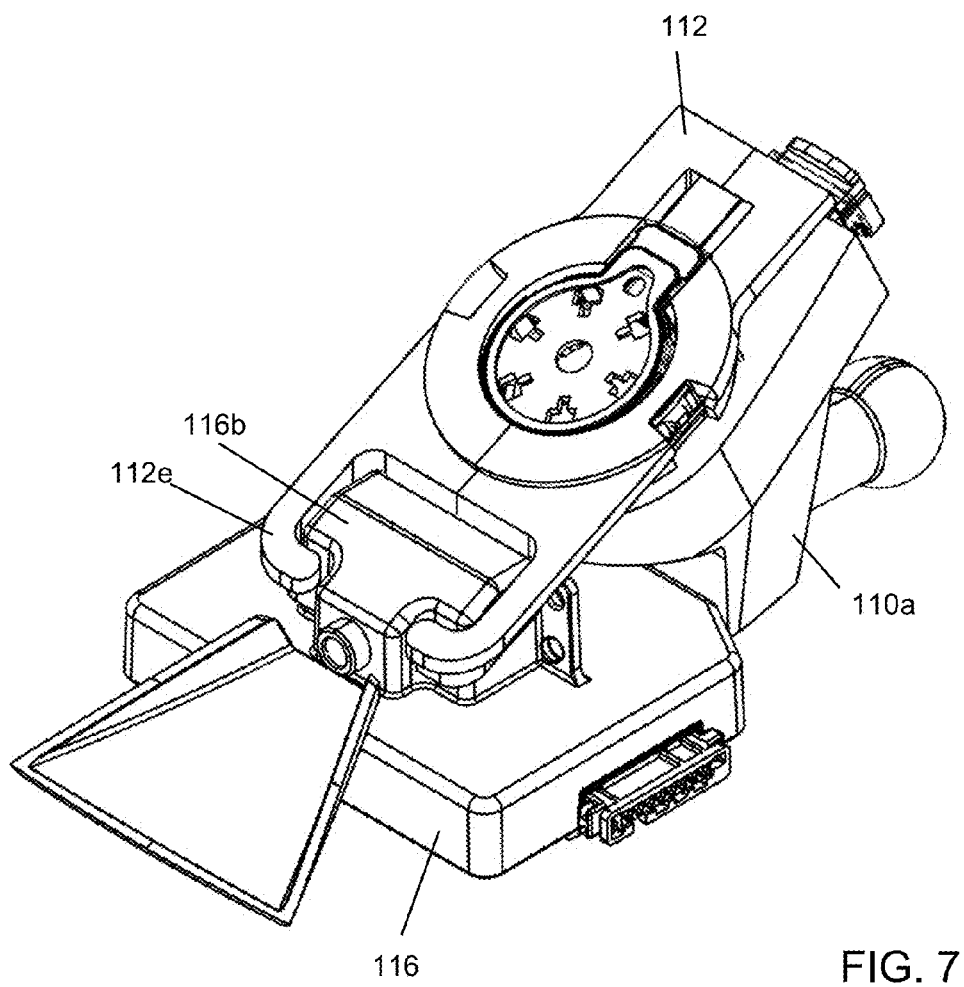
FIG. 7 is a perspective view of another accessory mounting system of the present invention.
Figure 8:
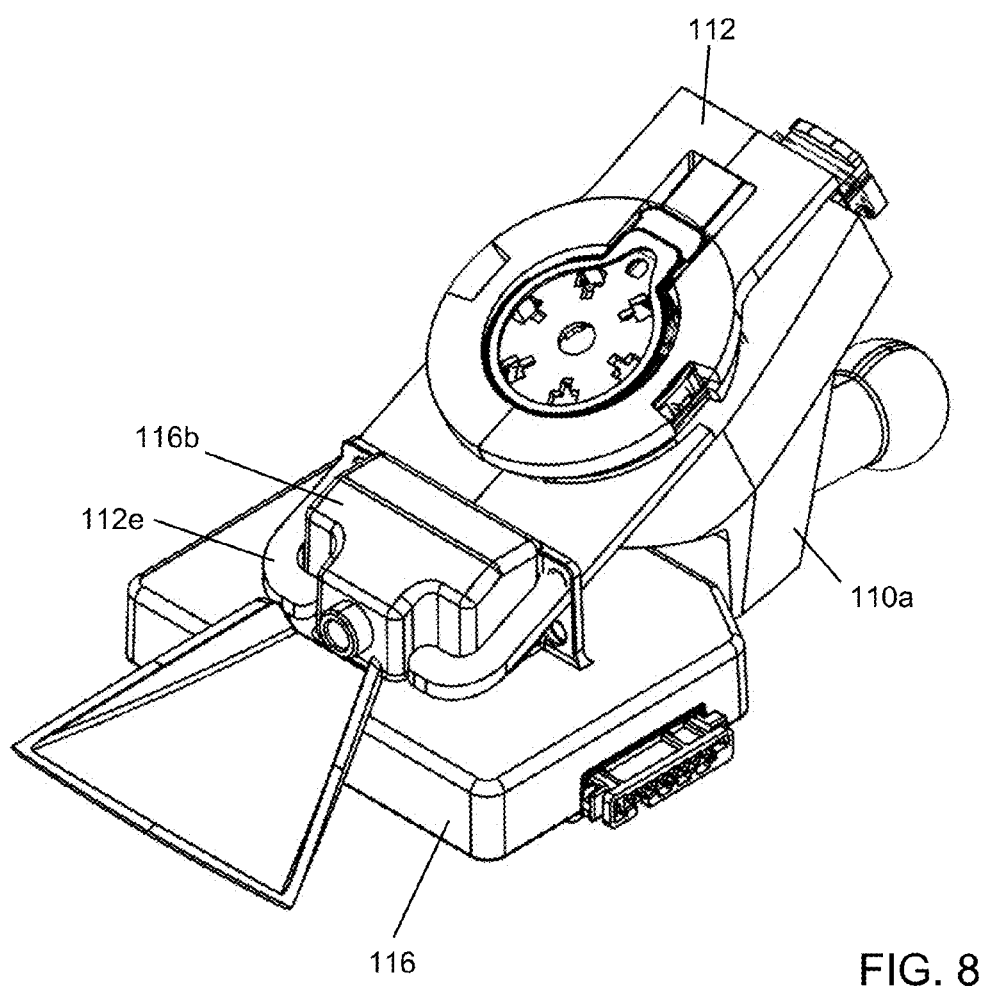
FIG. 8 is another perspective view of the accessory mounting system of FIG. 7.

Optionally, and such as shown in FIGS. 7 and 8, the bracket 112 may otherwise attach at a camera module 116, such as via arms or tabs or hooks 112e that engage or wrap around a portion 116b of the camera module 116 to hold the camera module at the bracket 112. The rear portion of the camera module may engage the mirror mount 110a or may engage a tab or the like of the bracket to retain the module at the bracket.

The imager or photosensor array of the camera module may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2013/123161; WO 2013/019795; WO 2011/028686 and/or WO 2010/099416, and/or U.S. patent application Ser. No. 13/681,963, filed Nov. 20, 2012, now U.S. Pat. No. 9,264, 673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012 and published Jan. 3, 2013 as U.S. Publication No. US-2013-0002873, which are all hereby incorporated herein by reference in their entireties. The system may communicate with other communication systems via any suitable means, such as by utilizing aspects of the systems described in U.S. patent application Ser. No. 13/377,673, filed May 11, 2012, now U.S. Pat. No. 9,036, 026, and/or Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094;

6,396,397; 6,806,452; 6,690,268; 7,005,974; 7,123,168; 7,004,606; 6,946,978; 7,038,577; 6,353,392; 6,320,176; 6,313,454 and/or 6,824,281, and/or International Publication Nos. WO 2013/016408; WO 2010/099416 and/or WO 2011/028686, and/or U.S. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480, 149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965, 336, and/or International Publication Nos. WO/2009/036176 and/or WO/2009/046268, which are all hereby incorporated herein by reference in their entireties.

The mirror head (including the reflective element and mirror casing) is adjustable relative to a base portion or mounting assembly to adjust the driver's rearward field of view when the mirror assembly is normally mounted at or in the vehicle. The mounting base or structure may be part of a single-ball or single-pivot mounting assembly, whereby the mirror head is adjustable relative to the vehicle windshield about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as pivot mounting assemblies of the types described in U.S. Pat. Nos. 8,451,332; 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483, 438, and/or U.S. Pat. Pub. No. US-2006-0061008, which are hereby incorporated herein by reference in their entireties). The mounting base may comprise a metallic ball portion or may comprise a molded (such as injection molded) polymeric mounting base or may be otherwise formed, depending on the particular application of the mirror assembly.

The mirror head of the mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, which are hereby incorporated herein by reference in their entireties), or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO/2013/ 071070; WO 2012/051500 and/or WO/2013/126719, which are all hereby incorporated herein by reference in their entireties (and with electrochromic and prismatic mirrors of such construction are commercially available from the assignee of this application under the trade name INFINITY™ mirror).

The mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties.

Optionally, the mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, published Apr. 8, 2010, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318, 870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255, 451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227, 675; 6,229,319 and/or 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 7,855; 755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. patent application Ser. No. 13/023,750, filed Feb. 9, 2011, now U.S. Pat. No. 8,890,955; Ser. No. 09/585,379, filed Jun. 1, 2000, now abandoned; and/or Ser. No. 10/207,291, filed Jul. 29, 2002, now abandoned, and/or U.S. Pat. Pub. Nos. US-2006-0061008; US-2006-0050018; US-2009-0015736; US-2009-0015736 and/or US-2010-0097469, and/or International Publication No. WO 2011/028686, which are all hereby incorporated herein by reference in their entireties.

The video display screen may be controlled or operable in response to an input or signal, such as a signal received from one or more cameras or image sensors of the vehicle, such as a video camera or sensor, such as the forward facing camera or a rearward facing camera or other exterior facing camera of the vehicle or such as an interior monitoring camera of the vehicle, with the camera comprising any suitable imager or image sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EyeQ™ image processing chip available from Mobileye Vision Technologies Ltd. of Jerusalem, Israel, and such as an image processor of the types described in International Publication No. WO/2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Changes and modifications in the specifically described embodiments may be carried out without departing from the principles of the present invention, which is intended to be limited only by the scope of the appended claims as interpreted according to the principles of patent law.

The invention claimed is:

1. An accessory system for a vehicle, said accessory system comprising:

a bracket configured for adhesive attachment at an in-cabin surface of a vehicle windshield;

wherein said bracket comprises an attaching portion having an aperture therethrough;

wherein said bracket comprises a pair of attaching arms extending from said attaching portion;

wherein an interior rearview mirror assembly has a mounting base that is attached at said attaching portion of said bracket with said attaching portion of said bracket adhesively attached at the in-cabin surface of the vehicle windshield;

wherein, with said mounting base attached at said attaching portion, a rain sensor is disposed at the in-cabin surface of the vehicle windshield and wherein said aperture of said attaching portion circumscribes said rain sensor;

wherein said attaching portion comprises a generally planar attaching portion that extends along the in-cabin surface of the vehicle windshield when said bracket is adhesively attached thereat, and wherein, with said bracket adhesively attached at the in-cabin surface of the vehicle windshield, said attaching arms extend from a lower region of said attaching portion along the in-cabin surface of the vehicle windshield below said attaching portion;

wherein said attaching arms are spaced apart and extend from said lower region of said attaching portion of said bracket downward along the in-cabin surface of the vehicle windshield below said attaching portion, and wherein lower ends of said attaching arms are configured to engage respective receiving portions of a forward camera module; and wherein, with said attaching portion of said bracket adhesively attached at the in-cabin surface of the vehicle windshield, said forward camera module is attached at said attaching arms of said bracket and generally at the in-cabin surface of the vehicle windshield below said attaching portion, and wherein said attaching arms and said receiving portions are configured to attach said forward camera module at said bracket so that an imager of said forward camera module is below said bracket and has a field of view through the vehicle windshield.

2. The accessory system of claim 1, wherein, with said attaching portion of said bracket adhesively attached at the in-cabin surface of the vehicle windshield, said mounting base of said mirror assembly is snap attached at said attaching portion of said bracket.

3. The accessory system of claim 2, wherein said mirror assembly comprises a mirror head that is pivotally mounted at said mounting base.

4. The accessory system of claim 1, wherein said lower ends of said attaching arms comprise hooks and said forward camera module comprises protrusions, and wherein said forward camera module is attached at said bracket via said hooks engaging said protrusions of said forward camera module.

5. The accessory system of claim 1, wherein said rain sensor is disposed at the in-cabin surface of the vehicle windshield before said mounting base is attached at said attaching portion of said bracket.

6. The accessory system of claim 1, wherein said rain sensor is attached at said mounting base before said mounting base is attached at said attaching portion of said bracket.

7. The accessory system of claim 1, wherein, with said attaching portion of said bracket adhesively attached at the in-cabin surface of the vehicle windshield, said rain sensor is disposed at the in-cabin surface of the vehicle windshield before said mounting base is attached at said attaching portion of said bracket.

8. The accessory system of claim 1, wherein, with said attaching portion of said bracket adhesively attached at the in-cabin surface of the vehicle windshield, said rain sensor is attached at said mounting base before said mounting base is attached at said attaching portion of said bracket.

9. The accessory system of claim 1, wherein said lower ends of said attaching arms comprise hooks and said forward camera module comprises recesses, and wherein said forward camera module is attached at said bracket via said hooks engaging said recesses of said forward camera module.

10. The accessory system of claim 1, wherein, with said generally planar attaching portion of said bracket adhesively attached at the in-cabin surface of the vehicle windshield, said bracket supports at least said interior rearview mirror assembly and said forward camera module at the vehicle windshield.

11. The accessory system of claim 1, wherein said bracket comprises a metallic material.

12. An accessory system for a vehicle, said accessory system comprising:

a bracket configured for adhesive attachment at an in-cabin surface of a vehicle windshield;

wherein said bracket comprises a metallic material;

wherein said bracket comprises an attaching portion having an aperture therethrough;

wherein said bracket comprises a pair of attaching arms extending from said attaching portion;

wherein an interior rearview mirror assembly has a mounting base that is attached at said attaching portion of said bracket with said attaching portion of said bracket adhesively attached at the in-cabin surface of the vehicle windshield;

wherein, with said mounting base attached at said attaching portion, a rain sensor is disposed at the in-cabin surface of the vehicle windshield and wherein said aperture of said attaching portion circumscribes said rain sensor;

wherein said attaching portion comprises a generally planar attaching portion that extends along the in-cabin surface of the vehicle windshield when said bracket is adhesively attached thereat, and wherein, with said bracket adhesively attached at the in-cabin surface of the vehicle windshield, said attaching arms extend from a lower region of said attaching portion along the in-cabin surface of the vehicle windshield below said attaching portion;

wherein said attaching arms are spaced apart and extend from said lower region of said attaching portion of said bracket downward along the in-cabin surface of the vehicle windshield below said attaching portion, and wherein lower ends of said attaching arms are configured to engage respective receiving portions of a forward camera module;

wherein, with said attaching portion of said bracket adhesively attached at the in-cabin surface of the vehicle windshield, said forward camera module is attached at said attaching arms of said bracket and generally at the in-cabin surface of the vehicle windshield below said attaching portion, and wherein said attaching arms and said receiving portions are configured to attach said forward camera module at said bracket so that an imager of said forward camera module is below said bracket and has a field of view through the vehicle windshield; and wherein, with said generally planar attaching portion of said bracket adhesively attached at the in-cabin surface of the vehicle windshield, said bracket supports at least said interior rearview mirror assembly and said forward camera module at the vehicle windshield.

13. The accessory system of claim 12, wherein, with said generally planar attaching portion of said bracket adhesively attached at the in-cabin surface of the vehicle windshield, said mounting base of said mirror assembly is snap attached at said attaching portion of said bracket, and wherein said mirror assembly comprises a mirror head that is pivotally mounted at said mounting base.

14. The accessory system of claim 12, wherein said lower ends of said attaching arms comprise hooks and said forward camera module comprise protrusions, and wherein said forward camera module is attached at said bracket via said hooks engaging said protrusions of said forward camera module.

15. The accessory system of claim 12, wherein said lower ends of said attaching arms comprise hooks and said forward camera module comprises recesses, and wherein said forward camera module is attached at said bracket via said hooks engaging said recesses of said forward camera module.

16. The accessory system of claim 12, wherein, with said generally planar attaching portion of said bracket adhesively attached at the in-cabin surface of the vehicle windshield, one of (i) said rain sensor is disposed at the in-cabin surface of the vehicle windshield before said mounting base is attached at said attaching portion of said bracket, and (ii) said rain sensor is attached at said mounting base before said mounting base is attached at said attaching portion of said bracket.

17. An accessory system for a vehicle, said accessory system comprising:

a bracket configured for adhesive attachment at an in-cabin surface of a vehicle windshield;

wherein said bracket comprises a metallic material;

wherein said bracket comprises an attaching portion having an aperture therethrough;

wherein said bracket comprises a pair of attaching arms extending from said attaching portion;

wherein an interior rearview mirror assembly has a mounting base that is attached at said attaching portion of said bracket with said attaching portion of said bracket adhesively attached at the in-cabin surface of the vehicle windshield;

wherein, with said mounting base attached at said attaching portion, a rain sensor is disposed at the in-cabin surface of the vehicle windshield and wherein said aperture of said attaching portion circumscribes said rain sensor;

wherein said attaching portion comprises a generally planar attaching portion that extends along the in-cabin surface of the vehicle windshield when said bracket is adhesively attached thereat, and wherein, with said bracket adhesively attached at the in-cabin surface of the vehicle windshield, said attaching arms extend from a lower region of said attaching portion along the in-cabin surface of the vehicle windshield below said attaching portion;

wherein said attaching arms are spaced apart and extend from said lower region of said attaching portion of said bracket downward along the in-cabin surface of the vehicle windshield below said attaching portion, and wherein lower ends of said attaching arms are configured to engage respective receiving portions of a forward camera module;

wherein, with said attaching portion of said bracket adhesively attached at the in-cabin surface of the vehicle windshield, said forward camera module is attached at said attaching arms of said bracket and generally at the in-cabin surface of the vehicle windshield below said attaching portion, and wherein said attaching arms and said receiving portions are configured to attach said forward camera module at said bracket so that an imager of said forward camera module is below said bracket and has a field of view through the vehicle windshield; and wherein said lower ends of said attaching arms comprise hooks and said forward camera module comprise protrusions, and wherein said forward camera module is attached to said bracket via said hooks engaging said protrusions of said forward camera module.

18. The accessory system of claim 17, wherein, with said generally planar attaching portion of said bracket adhesively attached at the in-cabin surface of the vehicle windshield, said mounting base of said mirror assembly is snap attached at said attaching portion of said bracket, and wherein said mirror assembly comprises a mirror head that is pivotally mounted at said mounting base.

19. The accessory system of claim 17, wherein one of (i) said rain sensor is disposed at the in-cabin surface of the vehicle windshield before said mounting base is attached at said attaching portion of said bracket and (ii) said rain sensor is attached at said mounting base before said mounting base is attached at said attaching portion of said bracket.

20. The accessory system of claim 17, wherein, with said generally planar attaching portion of said bracket adhesively attached at the in-cabin surface of the vehicle windshield, said bracket supports at least said interior rearview mirror assembly and said forward camera module at the vehicle windshield.

* * * * *